C. Stoll,
Cheese Cover,
N°. 54,437. Patented May 1, 1866.
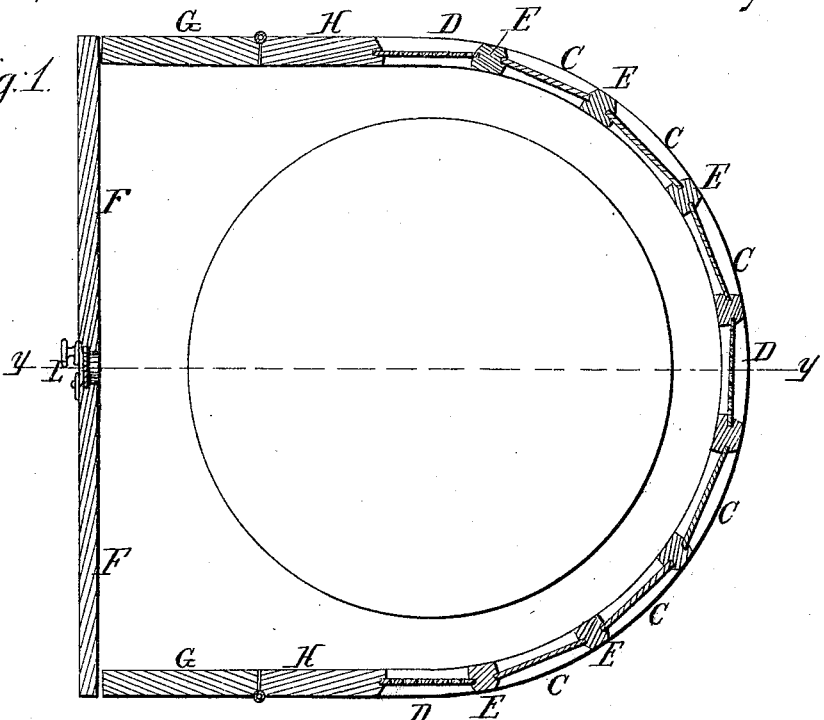
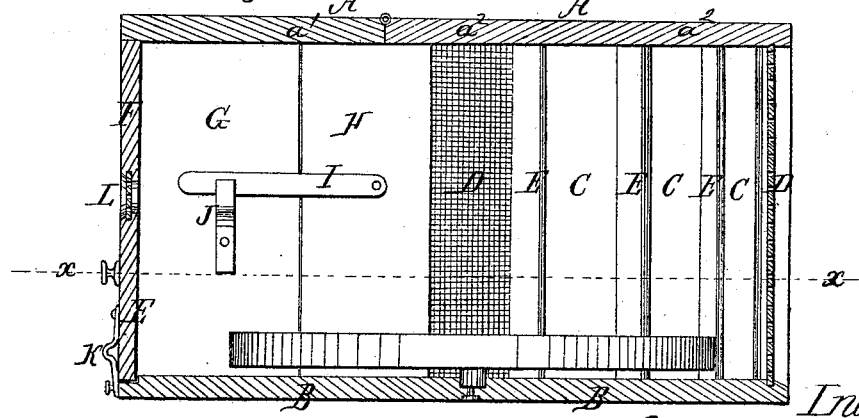
Witnesses:
Inventor:
Conrad Stoll

UNITED STATES PATENT OFFICE.

CONRAD STOLL, OF MOKENA, ILLINOIS.

IMPROVEMENT IN CHEESE-BOXES.

Specification forming part of Letters Patent No. 54,437, dated May 1, 1866.

*To all whom it may concern:*

Be it known that I, CONRAD STOLL, of Mokena, Will county, State of Illinois, have invented a new and Improved Cheese-Box; and I do hereby declare that the following is a full, clear, and exact description thereof, which will enable others skilled in the art to make and use the same, reference being had to the accompanying drawings, forming part of this specification, in which—

Figure 1 is a horizontal section of my improved cheese-box, taken through the line $x\,x$, Fig. 2. Fig. 2 is a vertical section of the same, taken through the line $y\,y$, Fig. 1.

Similar letters of reference indicate like parts.

My invention has for its object to furnish a cheese-box by means of which cheese may be kept free from dust and insects, and also from drying up from the time it is cut until it is all gone; and it consists, first, in the combination of a circular revolving support with the cheese-box; and, second, of a cheese-box constructed and arranged as hereinafter more fully described.

The top A and bottom B of the box are flat and parallel to each other. The rear side is circular and the front square, as represented in the drawings. The rear or circular part of the box is formed of panels of glass C, and a fine wire-gauze D, or its equivalent, set into upright slats E and into the top and bottom boards, in the manner in which glass is set into a window-sash. I usually make three of these panels of fine wire-gauze or its equivalent. The front part, $a'$, of the top of the box and the entire front or forward side, F, of the box are rigidly attached to each other, and the angular lid or door thus formed is hinged to the stationary part $a^2$ of the top A of the box, as shown in Fig. 2. The front portion, G, of the straight part of the sides is hinged to the stationary part H of such sides, so as to open or swing outward, as shown in Fig. 1. This arrangement allows the whole front of the box to be opened up for convenience in cutting the cheese. These swinging parts G of the sides are held closed by latches I, pivoted to the parts H of said sides, and latching into catches J, attached to the said swinging parts G, as shown in Fig. 2. The angular lid $a'$ F is fastened shut by a hook, K, hooking into a catch attached to the front edge of the bottom board, as shown in Fig. 2.

L is a panel of wire-gauze or perforated sheet metal let into the front F of the box, as seen in Figs. 1 and 2.

M is a circular support for the cheese, of such a size as to revolve freely within the box, and which is pivoted at its center to the bottom board, B, as shown in Fig. 2. The cheese is placed upon this support, and by opening the hinged parts of the box and revolving the support M any desired part of the cheese can be brought to the front and conveniently cut.

I claim as new and desire to secure by Letters Patent—

1. The combination of the circular revolving support M with a cheese-box, substantially as herein described, and for the purpose set forth.

2. A cheese-box constructed and arranged substantially as herein described, and for the purpose set forth.

CONRAD STOLL.

Witnesses:
DIEDERICH BRUMUND,
FREDERICK J. SHATLEY.